United States Patent [19]

Walker

[11] Patent Number: 4,688,374
[45] Date of Patent: Aug. 25, 1987

[54] PIPE WRAPPING MACHINE

[75] Inventor: Grant W. Walker, Sacramento, Calif.

[73] Assignee: Essex Composite Wrap, Inc., Rio Linda, Calif.

[21] Appl. No.: 837,906

[22] Filed: Mar. 10, 1986

[51] Int. Cl.4 .............................................. B65B 49/00
[52] U.S. Cl. ......................................... 53/587; 53/211; 53/214
[58] Field of Search ................. 53/211, 214, 216, 587, 53/116, 461, 117, 465, 118, 210

[56] References Cited

U.S. PATENT DOCUMENTS

| | | | |
|---|---|---|---|
| 1,654,258 | 12/1927 | Hooper | 53/587 X |
| 2,026,532 | 1/1936 | Haupt | 53/211 X |
| 2,831,304 | 4/1958 | Michaud | 53/211 |
| 3,111,795 | 11/1963 | Troste, Jr. et al. | 53/587 X |
| 3,407,565 | 10/1968 | Bender et al. | 53/214 |
| 4,137,690 | 2/1979 | Morgan | 53/211 X |
| 4,224,782 | 9/1980 | Moflag | 53/587 |
| 4,333,301 | 6/1982 | Koutonen et al. | 53/211 X |

Primary Examiner—Robert L. Spruill
Assistant Examiner—Steven P. Weihrouch
Attorney, Agent, or Firm—Lothrop & West

[57] ABSTRACT

A machine for wrapping sheet material around a circular-cylindrical pipe extending longitudinally and horizontally and supported along the bottom on a longitudinally and horizontally extending supporting roller or rollers has a table supporting the sheet material to extend between the bottom of the pipe and the supporting roller or rollers. The pipe is rotated by a motor-driven soft roller frictionally engaging the pipe and any sheet material around the pipe near one end and moving with the pipe away from the support roller or rollers as the wrapping material increases the diameter of the wrapped pipe.

6 Claims, 9 Drawing Figures

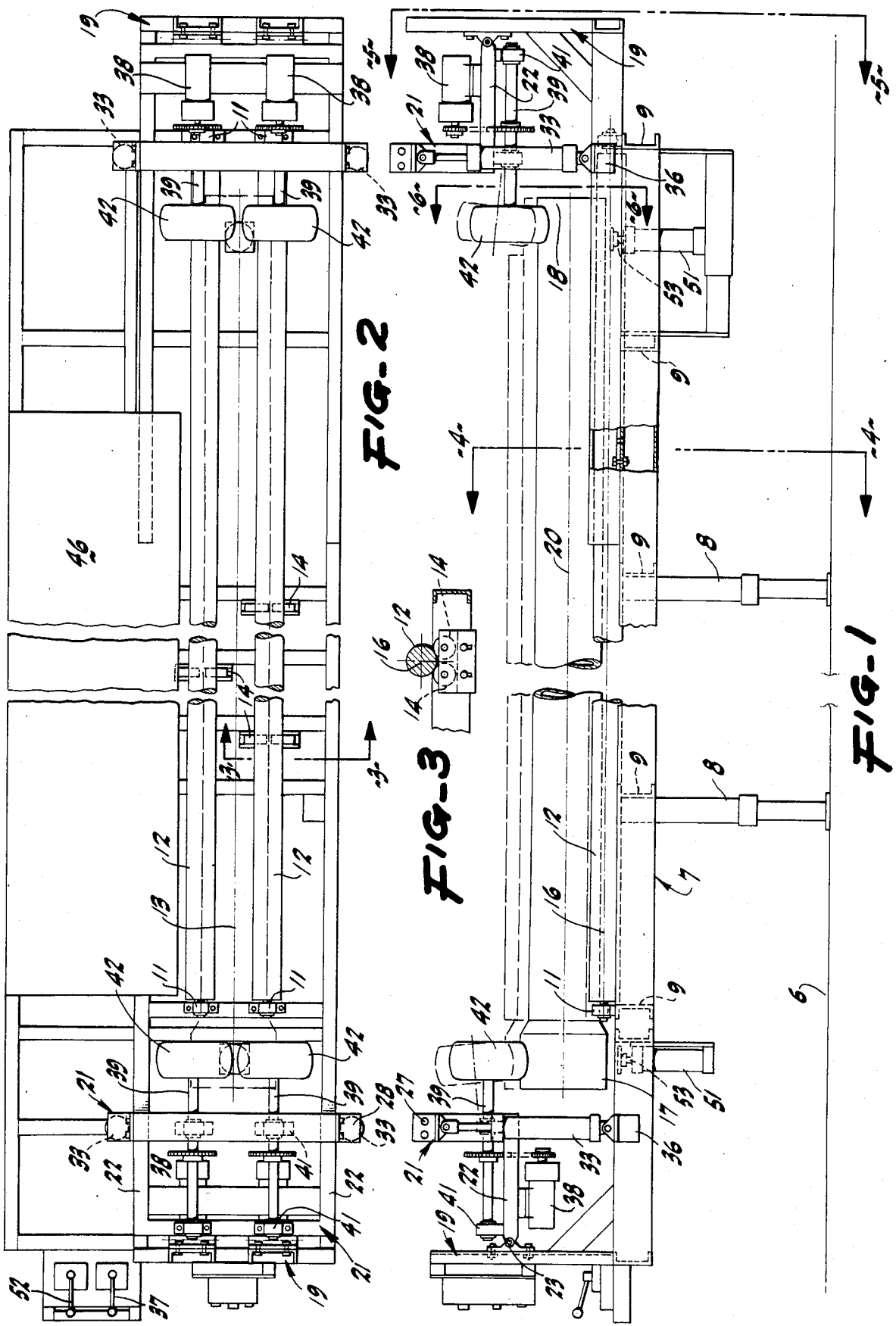

PIPE WRAPPING MACHINE

BRIEF SUMMARY OF THE INVENTION

To provide a circular-cylindrical pipe with an insulating or protective covering, a machine has a longitudinal roller or rollers engaging the outside of the pipe from below and supports the pipe for rotation about a generally horizontal axis parallel to the roller or rollers. The covering material, usually a flat sheet or batt of about the same length as the pipe, is supported by the machine and feeds in between the bottom of the pipe and the supporting roller or rollers. The leading edge of the sheet is made to rotate with the pipe and so to wrap the pipe with one or more layers that add to the outside diameter of the wrapped pipe product. A driven friction wheel engages the pipe near one end and not only rotates the pipe on the roller or rollers, but also engages any added wrapping and so moves away from the supporting roller or rollers as the product (pipe and wrapping) diameter increases. Adjustments are made for various sizes and lengths of pipe.

BACKGROUND OF THE INVENTION

Various commercial pipes, usually of iron or cast concrete and of roughly a foot or two in diameter and having a bell at one end and a spigot at the other end are usually linked end to end to carry liquids or gases. They may be buried in the ground or supported in the air. To protect the outside of the pipe from adverse influences and particularly to insulate the pipe from substantial temperature losses or gains, it is customary to provide the outside of the pipe with a suitable wrapping such as thermal insulation. While insulators vary a great deal, a common form is a composite of a fiber glass sheet or batt or blanket chiefly comprised of a foam layer or a fiber glass body of a closed-cell nature covered with a reinforcing resin sheet or coating. These are usual practices, but the pipe diameter, the pipe shape and length and the nature of the covering material can vary widely within the scope of operation of the present machine. A principal object of the invention is to provide a device and way of wrapping a pipe with a selected covering in an expeditious, uniform and effective fashion. For this purpose a machine is provided as disclosed herein and illustrated in the accompanying drawings.

BRIEF DESCRIPTION OF THE SEVERAL VIEWS OF THE DRAWINGS

FIG. 1 is a side elevation of a machine constructed pursuant to the invention, certain portions being broken away to reduce the length of the figure.

FIG. 2 is a plan of the machine as illustrated in FIG. 1, also with a portion broken away for the same reason.

FIG. 3 is a cross-section of a detail, the plane of which is indicated by the line 3—3 of FIG. 2

DETAILED DESCRIPTION

Figure 5:
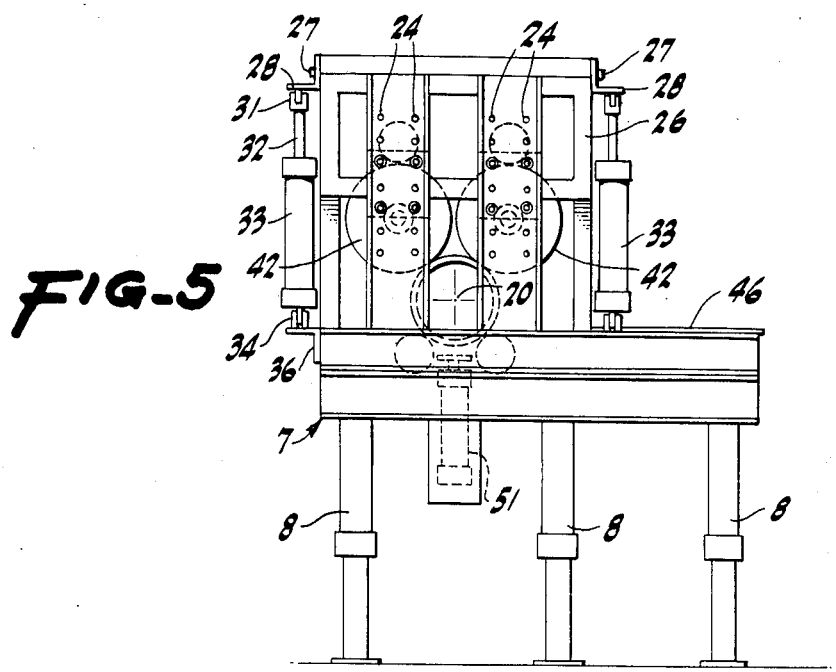
FIG. 5 is an end elevation of the machine, the plane of the elevation being illustrated by the line 5—5 of FIG. 1.
Figure 4:
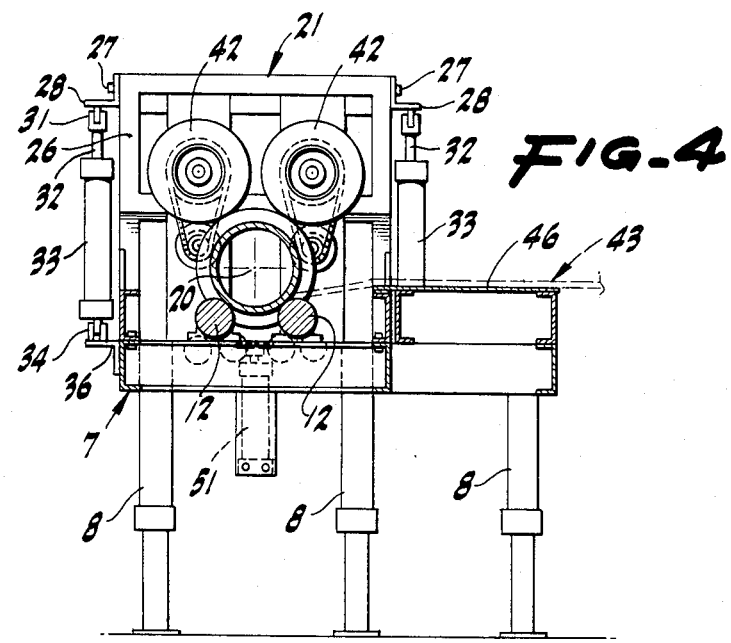
FIG. 4 is a cross-section, the plane of which is indicated by the line 4—4 of FIG. 1.

While the wrapping machine can be varied a great deal in its construction, depending on the size and nature of the pipes to be handled and depending also upon the nature of the covering to be applied, it has with success been embodied in the form shown herein. In this arrangement the device is disposed on a stationary floor 6 or the ground and is provided with a main frame 7 fabricated of the customary shapes and angles. The machine is carried on extensible legs 8 so that the height of the frame 7 from the ground 6 can be readily adjusted. Upon occasion, the frame is mounted on wheels for support and for shifting from place to place in any customary way. The main frame 7 is particularly provided with special cross members 9 on which are mounted journals 11 to support longitudinally extending rollers 12 for rotation about horizontal longitudinally extending axes. As particularly shown in FIG. 2, the supporting rollers 12 are preferably provided in a parallel pair extending along opposite sides of a longitudinal center line 13 so that when viewed in plan the machine is essentially symmetrical.

Since the rollers 12 are relatively long and are relied upon to maintain a straight alignment for the pipe being handled, they are particularly provided at intervals between their ends with auxiliary bearings 14 so that their own axes or center lines 16 always remain substantially parallel to the frame center line 13. The disposition of the rollers 12 on the frame 7 is such that pipes of various configurations can be accommodated. For example, if the pipe has a bell end 17, such bell is disposed beyond one end of the rollers so as to have adequate room for rotation. Opposite the bell, the pipe end is usually a plain spigot 18 not requiring extra room. Usually there is a plain, circular-cylindrical pipe end of a size readily to fit into the interior of the bell 17, as especially shown in FIG. 9. A pipe of the sort described sits readily on the rollers and is rotatable about its own axis 20. The longitudinal position of the pipe is accomplished by initially lowering the pipe onto the rollers by means of a hoist or crane or forklift (not shown) in the customary way.

In order that the pipe may be appropriately power rotated, the rollers 12 are free running and there are provided substantially duplicate driving means. These are effective near and on the opposite pipe ends, one acting near the bell 17 and the other acting near the spigot 18. Since these driving devices are substantially duplicates, the description of one applies to the other. To an upright end framework 19 at the end of the main frame 7, there is mounted a driving frame 21. This driving frame 21 is generally rectangular and includes a couple of side members 22 each having a pivot connector 23 to an adjacent portion of the framework 19. Each pivot connector 23 extends transversely of the axis 20 and is preferably adjustably mounted by removable bolts extending through selected ones of pairs of apertures 24 in the upright members of the frame 7 so that the driving frame 21 can be situated at any desired height to accommodate pipes of varying diameters.

The side members 22 are connected by a generally rectangular end frame 26 and have similarly apertured locating members 27 to receive support angles 28 at any of several fastening positions. To the members 27 bolts connect angle members 29 themselves connected by pivots 31 to the end of a respective piston rod 32 actuated by a pneumatic cylinder 33. In turn, the cylinder 33 is connected by a pivot 34 to a transverse channel 36 forming part of and fastened to the main frame 7. The two cylinders 33 are connected in a standard fashion to a control lever 37 (FIG. 1) so that an operator can lift and lower the frame 21 pneumatically in a pivotal fashion about the transverse pivot connectors 23.

Mounted on the driving frame 21 are driving mechanisms each including a power motor 38, the pair of motors being disposed symmetrically on opposite sides of the center of the machine. Each motor 38 is connected by a belt or chain to its own driven shaft 39 mounted in journal bearings 41 on the driving frame 21 and is cantilevered thereon to carry a driving wheel 42. This is a yieldable or pipe accommodating member preferably having a pneumatic tire of approximately a toroidal configuration. The wheel 42 is positioned to engage the subjacent part of a pipe lying on the supporting rollers 12. When an operator operates a valve by the control lever 37, the wheels 42 are lifted out of the way so that the pipe can be positioned or are lowered so that the pipe can be driven. Because of the pneumatic cylinders 33, the wheels 42 can be pressed against the subjacent parts of the pipe with any desired degree of yielding force.

With the wheels in engagement with the pipe and with the motors 38 energized, the pipe may be driven from one or both ends and is rotated about its own axis 20 on the support rollers 12. The pipes wrapped may not always be perfectly round nor exactly straight and may be externally rough. Supporting a pipe from below with the primary downward force being only gravity, the pipe can readily accommodate itself to its support. More especially, the piston rods 32 are yieldably (pneumatically) supported and the pneumatically tired driving wheels 42 are also yieldable. Thus a pipe that only approximates the theoretical shape and condition can be well rotated and wrapped.

Figure 6:
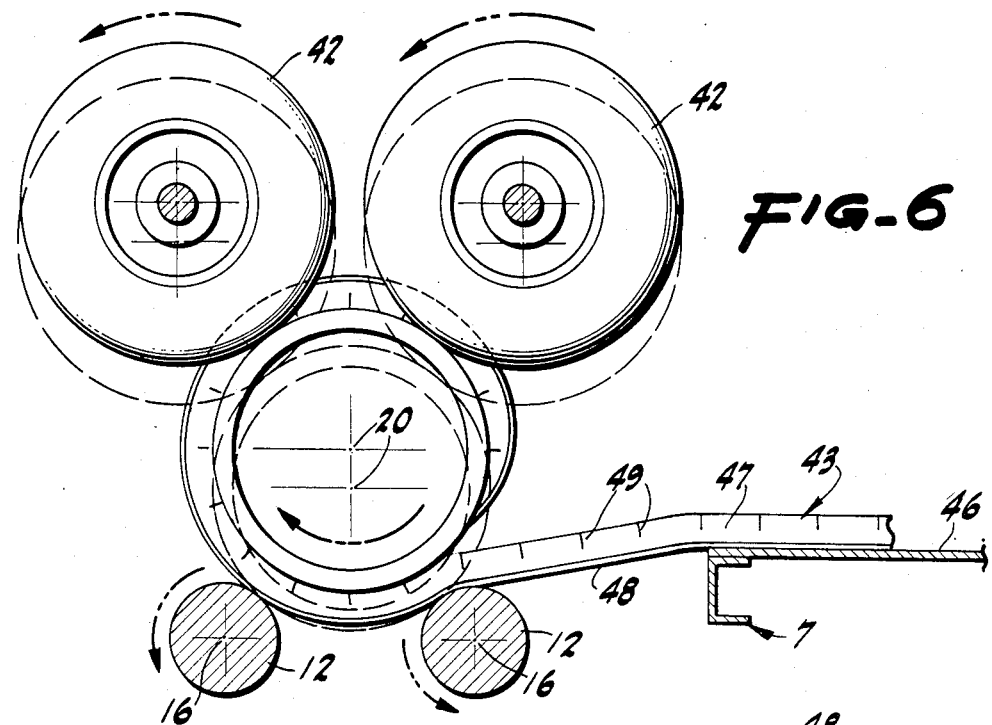
FIG. 6 is an enlarged cross-section, the plane of which is indicated by the line 6—6 of FIG. 1.
Figure 7:
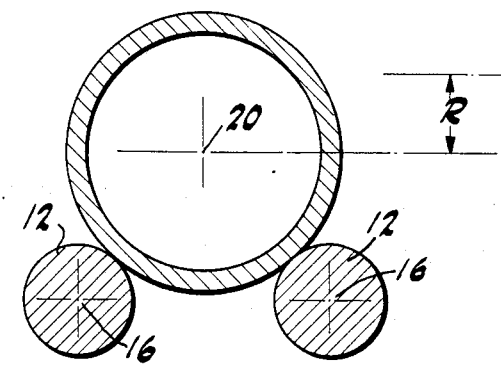
FIG. 7 is a cross-section on the line 6—6 of FIG. 1, omitting some of the operating parts and showing a pipe in position before wrapping.

As the pipe is revolved; for example, in a clockwise direction as seen in FIGS. 6 and 7, a wrapping material is placed thereon. The wrapping material is of any desired nature and size or thickness. Preferably, it is initially a generally flat sheet 43 supported on an approximately flat feeding table 46 extending from and supported by the main frame 7. In this instance, as an example only, the wrapping material or covering is inclusive of a layer 47 of a cellular or foam-like material or the like or is comprised of a fiber glass blanket the fibers of which are intertwined and spaced from each other to enclose air cells. The layer 47 is itself covered by another layer 48 of a plastic material such as a polyethylene sheet, the two layers together making up a unitary wrapper. Since the wrapper is somewhat bulky and relatively thick and is transformed from a flat condition into a curved cylindrical condition, the wrapper layer 47 is at intervals provided with slots 49 to allow ready transition from flat to curved condition.

Figure 8:
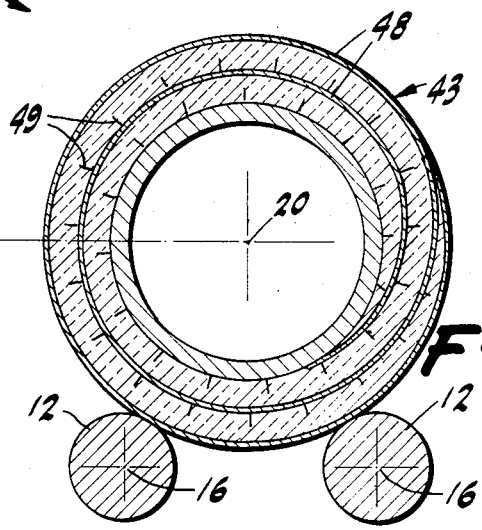
FIG. 8 is a view comparable to FIG. 7 and showing the pipe in position after wrapping.

The opposite, or leading and trailing, ends of the covering are diminished in thickness as shown in FIGS. 6 and 8. The leading edge is of little thickness and on its under side adjacent the edge is covered with adhesive. The cover leading edge is manually led from the table over the adjacent roller 12. The cover then is fed between the near roller 12 and the pipe as the cover becomes adhesively secured to the pipe outer surface. As the pipe is further rotated, the covering is also drawn between the other or far roller 12. The pipe cover then continues on around the pipe, as shown especially in FIG. 6.

As the covering advances between the rollers and the pipe and continues to encompass the pipe, the pipe is bodily lifted by the intervening covering away from the rollers 12. The pipe center line or axis 20 is lifted farther and farther away from or above the rollers. This lifting movement of the pipe is accommodated by a corresponding lifting rotation of the frames 26. The changing angularity of the axes of the drive shafts 39 for the soft wheels 42 is accompanied by a changing angular contact of the driving wheels 42 according to their toroidal shape.

The rotation of the pipe with the attached covering continues through the condition shown in FIG. 6 into a final condition as shown in FIG. 8, in which the tapered, trailing end of the covering is itself adhesively secured to the already wrapped covering and the job is completed. Thereupon the motors 38 are stopped and the piston rods 32 are all activated to swing the driving wheels out of the way. Lifting cylinders 51 mounted on the main frame 7 are energized by operation of a lever 52. Piston rods 53 in the cylinders are so projected to encounter the bottom of the pipe and to lift the pipe well above the subjacent rollers. A sling or the like can be rigged around the covered pipe and the pipe can be lifted from the supporting frame. Since the wrapping operation is completed, another bare pipe can then be positioned in the machine and the wrapping operation repeated.

Figure 9:
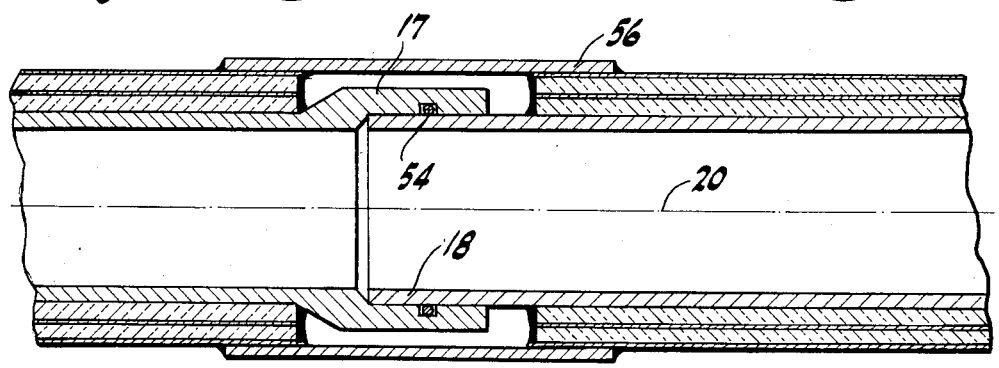
FIG. 9 is a longitudinal cross-section on an axial plane of a pair of connected pipes, each being wrapped and having a junction closure.

The finished pipe, especially as shown in FIG. 9, is usually longitudinally assembled with another finished pipe with the spigot of one pipe entered into and interfitting with the bell on the adjacent pipe. Often a seal 54 such as an 0-ring is interposed between the exterior of the spigot and the interior of the bell to make a tight joint. Since the covering material stops short of the end of the spigot and short of the related bell, a finish sleeve 56 is placed to overlap the connected ends and is suitably held in place, usually by adhesive, to provide a continuous covering of the pipes and their joint.

I claim:

1. A pipe wrapping machine for circumferentially wrapping an approximately circular-cylindrical pipe having a horizontal pipe axis comprising a main frame extending parallel to said pipe axis, a pair of pipe-supporting rollers, means for mounting said rollers to rotate on said frame about roller axes parallel to said pipe axis, a drive frame, means for mounting said drive frame on said main frame for pivotal movement toward and away from said rollers about a drive frame axis transverse to said pipe axis, a first driving shaft, means for mounting said first driving shaft on said drive frame for pivotal motion therewith and for rotation relative thereto about a shaft axis approximately parallel to said pipe axis, a motor on said drive frame for driving said first driving shaft, and a yieldable drive wheel mounted on said first driving shaft for rotation therewith and for engagement with the exterior surface of a pipe and a pipe wrapping supported on said rollers.

2. A device as in claim 1 in which said pivotal movement of said drive frame is about a horizontal drive frame pivot axis extending transversely of said pipe axis.

3. A device as in claim 1 including a pneumatically expansible chamber mechanism connected between said drive frame and said main frame for effecting said pivotal movement.

4. A device as in claim in which said means for mounting said driving shaft on said drive frame constrains said driving shaft to move with said drive frame in an arc about said transverse axis toward and away from said main frame.

5. A device as in claim 1 in which said yieldable drive wheel includes a toroidal pneumatic tire.

6. A device as in claim 1 including a pneumatically expansible chamber articulated to said main frame and to said drive frame for moving said drive frame yieldably toward and away from said main frame.

* * * * *